US 6,550,715 B1

(12) United States Patent
Reynolds et al.

(10) Patent No.: US 6,550,715 B1
(45) Date of Patent: Apr. 22, 2003

(54) MINIATURE VERTICAL TAKEOFF AND LANDING AIRCRAFT

(75) Inventors: John Reynolds, Stevenson Ranch, CA (US); Eric P. Young, Pasadena, CA (US); Joseph Wurts, Valencia, CA (US); Eric Knutson, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/005,746

(22) Filed: Dec. 7, 2001

(51) Int. Cl.$^7$ .............................................. B64C 27/06
(52) U.S. Cl. ........................ 244/7 B; 446/37; 244/17.11
(58) Field of Search ............................... 244/17.11, 7 B, 244/12.2, 23 C, 34 A; 446/36, 37, 57

(56) References Cited

U.S. PATENT DOCUMENTS

| | | | |
|---|---|---|---|
| 3,488,882 A | * | 1/1970 | Scott ........................ 244/12.1 |
| 4,249,334 A | * | 2/1981 | Goldfarb et al. ............ 446/179 |
| 5,289,994 A | * | 3/1994 | Del Campo Aguilera .. 244/12.1 |
| 5,295,643 A | * | 3/1994 | Ebbert et al. ............... 244/12.2 |
| 5,429,359 A | * | 7/1995 | Timperman et al. ........ 473/471 |
| 5,516,060 A | * | 5/1996 | McDonnell .................. 244/207 |
| 5,634,839 A | | 6/1997 | Dixon |
| 5,746,390 A | * | 5/1998 | Chiappetta .................. 244/12.2 |
| 5,836,545 A | | 11/1998 | Arlton et al. |
| 6,402,088 B1 | * | 6/2002 | Syrovy et al. ................. 244/10 |

FOREIGN PATENT DOCUMENTS

GB  2219560 A  * 12/1989  .......... B64C/29/00

* cited by examiner

Primary Examiner—Peter M. Poon
Assistant Examiner—Timothy D Collins

(57) ABSTRACT

A vertical takeoff and landing aircraft is disclosed that includes a support structure having a motor mounted vertically thereto, with the motor having a propeller for rotation in a horizontal plane. A power supply for the motor is mounted to the support structure below the motor and electrical coupled thereto. A plurality of fins are attached by their first end to the power and extending radially outward therefrom. Vertical posts have there first ends attached to the second end of the fins and extend upward to the plane of rotation of the propeller. A ring is mounted horizontally to the second ends of the plurality of vertical posts surrounding the propeller. The torque produced by the drag of fins as the aircraft rotates in the opposite direction reacting the torque of the propeller equal to the torque of the propeller necessary to achieve hover. The rotational inertia of aircraft is made equal to the rotational inertia of the propeller.

14 Claims, 2 Drawing Sheets

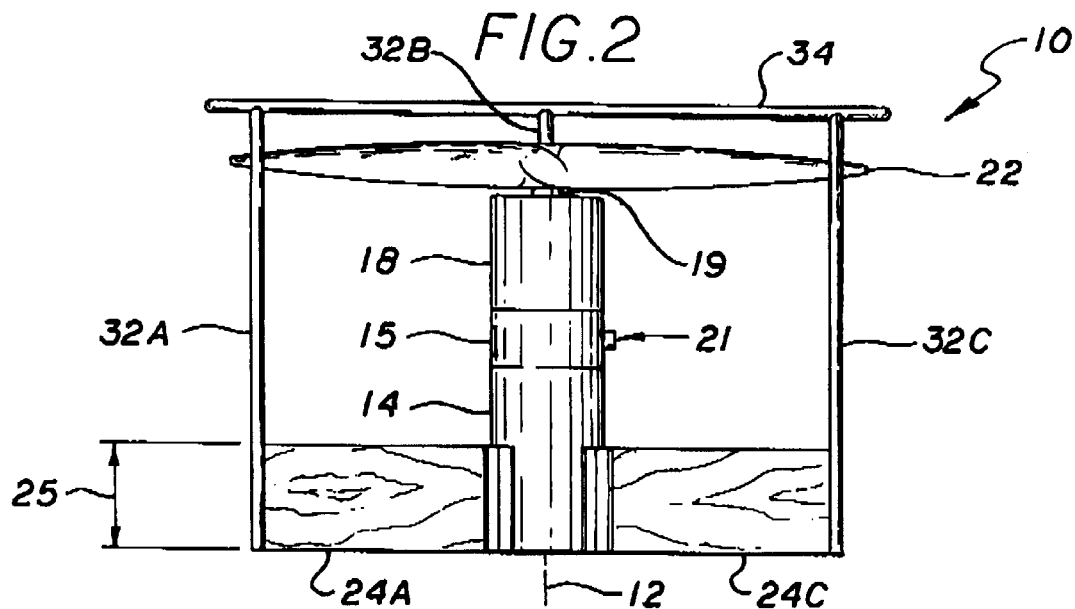
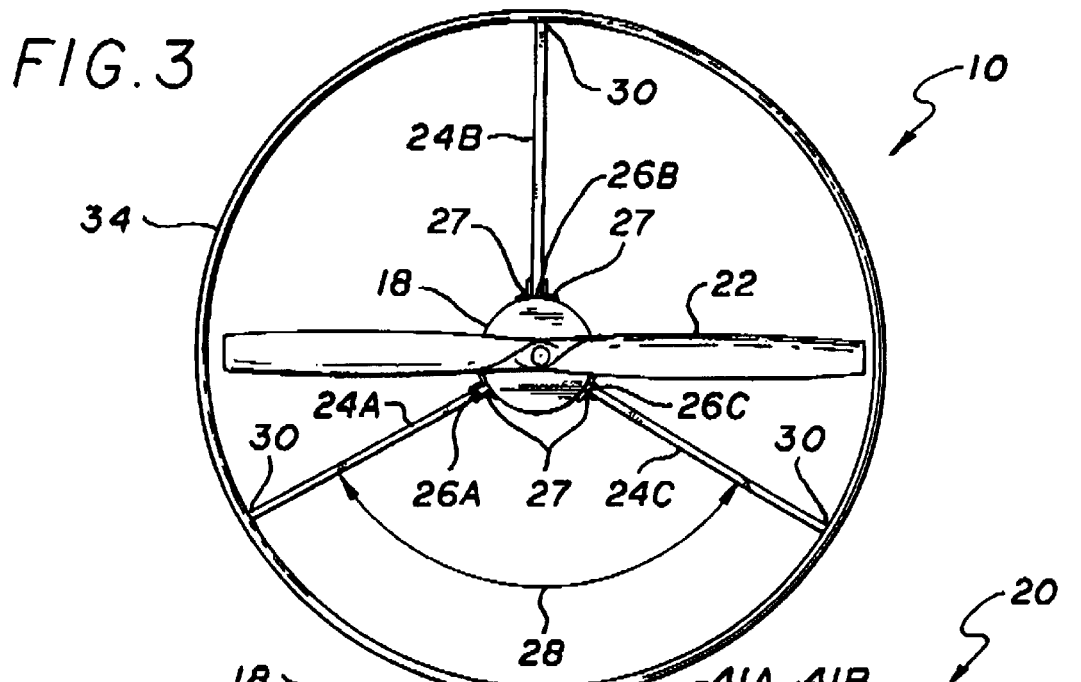
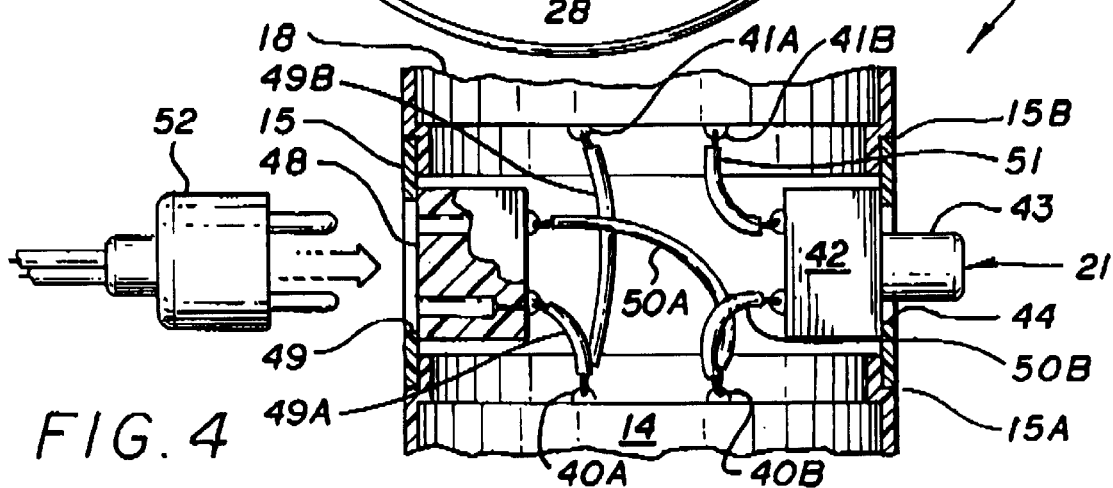

MINIATURE VERTICAL TAKEOFF AND LANDING AIRCRAFT

BACKGROUND OF THE INVENTION

1. Field of the Invention

The invention relates to the field of model aircraft and, in particular, to vertical takeoff and landing aircraft.

2. Description of Related Art

One of the problems in building micro-sized vertical takeoff and landing (VTOL) aircraft is to make them light enough to maintain flight and to counteract the gyroscopic effects of the rotating fan or propeller so that stable flight is obtained. On a model helicopter aircraft, it is difficult, but not impossible to design a tail rotor to balance the torque. An example of a toy helicopter design can be found in U.S. Pat. No. 5,836,545 Rotary Wing Model Aircraft, by R. E. Arlton, et al. A small two-cycle engine is used to power both the main and tail rotors. A gear assembly allows the tail rotor to be driven at three times the speed of the main rotor to balance torque.

Of course, counter-rotating propellers would generally solve the stability problem, but it overly complicates the design of the vehicle and raises its cost. Another approach is disclosed in U.S. Pat. No. 5,634,839 Toy aircraft And Method For Remotely Controlling Same by D. Dixon. Here a pair of horizontally ducted propellers are mounted to a frame. Also mounted to the frame are a pair of wings. The propellers provide lift as well as the wings, which rotate due to the frame reacting the torque of the propellers. While simpler than a helicopter, coupling power to the two propellers requires a complicated drive system.

Thus, it is a primary object of the invention to provide a vertical takeoff and landing miniature aircraft.

It is another primary object of the invention to provide a vertical takeoff and landing miniature aircraft that is inexpensive to manufacture.

It is a further object of the invention to provide a vertical takeoff and landing miniature aircraft that balances the rotational momentum of the propeller with counter rotation of the aircraft to provide stable flight.

SUMMARY OF THE INVENTION

The invention is a vertical takeoff and landing aircraft including a hollow support structure. A motor is mounted vertically to the support structure. The motor, preferably an electric motor is included having a propeller for rotation in a horizontal plane. A power supply for the motor, preferably a capacitor is mounted to the support structure below the motor. A plurality of fins extend radially outward from the capacitor. Vertical posts are connected to the ends of the fins that extend upward and terminate in proximity to the rotational plane of the propeller. A ring is mounted horizontally to top of the vertical posts in proximity to the plane of the propeller to protect the propeller should the aircraft strike a wall or the like.

The torque produced by the drag of fins as the aircraft rotates in the opposite direction reacting the torque of said propeller is set equal to the torque of the propeller necessary to achieve hover. In addition, the rotational inertia of the aircraft is made equal to the rotational inertia of the propeller. Thus the aircraft will climb and descend in a stable manner.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a side view of the aircraft.

FIG. 3 is a top view of the aircraft.

FIG. 4 is an enlarged view of the switching assembly controlling power from the capacitor to the motor.

DESCRIPTION OF THE PREFERRED EMBODIMENT

Figure 1:
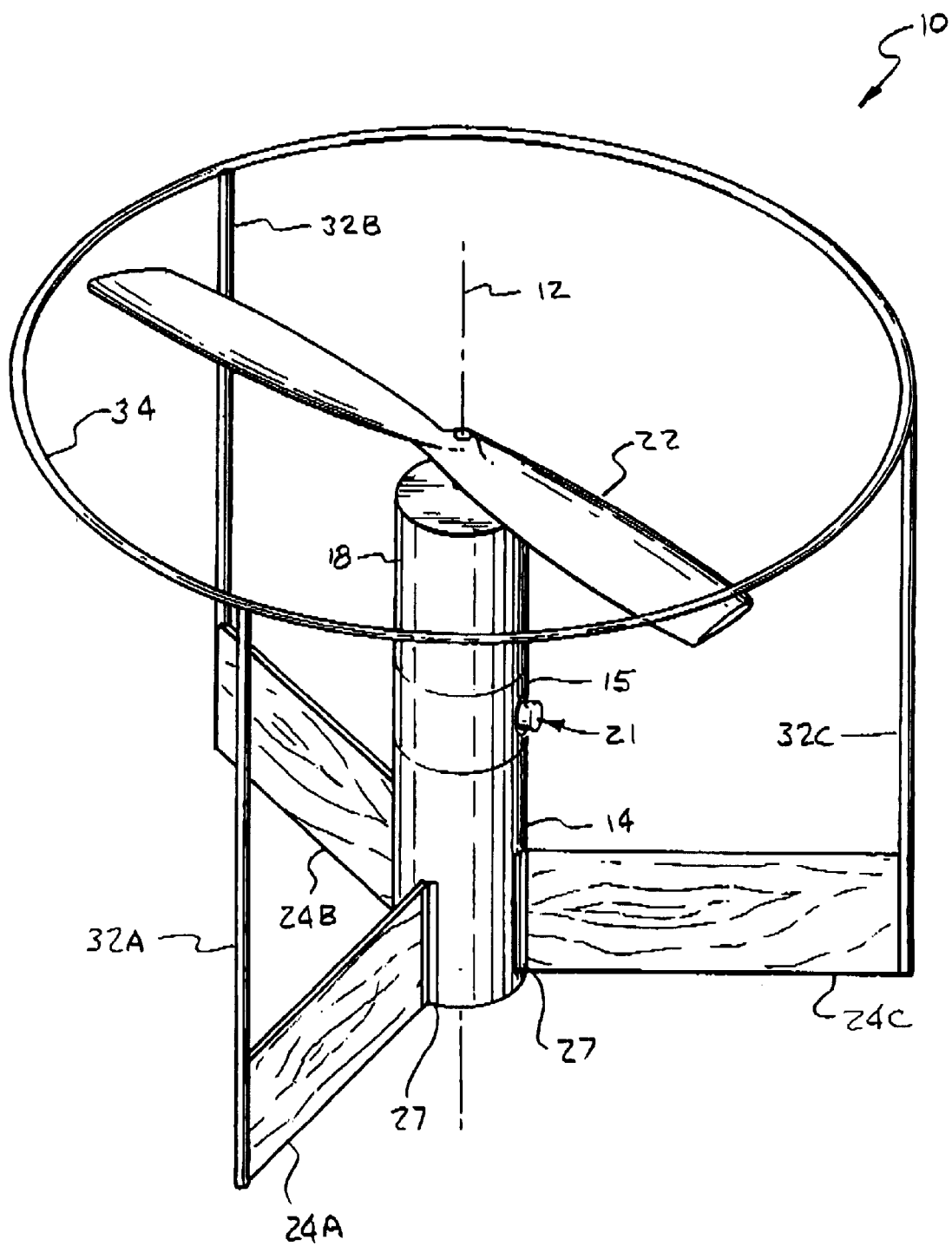
FIG. 1 is a perspective view of the aircraft

Referring to FIGS. 1–3, the aircraft, generally designated by numeral 10 includes a longitudinal axis or axis of rotation 12. The aircraft 10 further includes a power source, as illustrated a cylindrical shaped capacitor 13. A sleeve 15 is bonded by its first end 15A to the capacitor 14. A cylindrical shaped electric motor 18, having an output shaft 19, is bonded to the second end 15B of the sleeve 15 such that the motor is above and in a spaced relationship to the capacitor 14. An electrical circuit assembly 20, which will be subsequently discussed, connects the motor 18 to the capacitor 14. A propeller 22 is connected to the output shaft 19 of the motor 18.

Attached to the bottom end of the capacitor 14 are three thin flat fins 24A, 24B and 24C, having a height 25. Attachment is accomplished by bonding the first ends 26A to U shaped brackets 27 also bonded to the side of the capacitor 14 at its bottom end. They are equally spaced apart (120 degrees) with the angle indicated by numeral 28. The fins 24A–C are preferably made of a very lightweight material, such as balsa wood and are designed to produce drag upon rotation of the aircraft. The second ends 30 of the fins 24A–C are connected to three vertical posts 32A, 32B and 32C, respectively. The posts 32A–C extend upward and terminate in proximity to the rotational plane of the propeller 20 and join to a circular ring 34 that surrounds the propeller.

Referring to FIG. 4, the capacitor 14 includes positive and negative terminals 40A and 40B and the motor 18 includes positive and negative terminals 41A and 41B. the switch assembly includes a double throw double pole switch 42 having an actuation button 43 extending out a hole 44 in the sleeve 15. The switch is designed to either connect the capacitor 14 to the motor 18 or an electrical socket 48 extending into hole 49 in the side of the sleeve 15. The terminal 40A is electrically connected to the socket 48 and the positive terminal 41A of the motor 18 by wires 49A and 49B respectively. The terminal 40B is connected to the socket 48 and switch 42 by wires 50A and 50B. The switch 42 is also connected to terminal 41B of the motor 18 by wire 51. Thus when the switch 42 has disconnected the terminal 40B from the terminal 41B a plug 52 can be coupled to a battery (not shown) for charging the capacitor 14.

After charging, the plug 52 is removed. The switch 42 is then used to connect the terminal 40B of the capacitor 14 to terminal 41B of the motor 18, which will start propeller rotation and initiate flight. When the motor 18 is started, the aircraft 10 will take off vertically, with the ring 34 protecting the propeller 20 should the aircraft strike a structure. It should be noted that there are numerous other wiring configurations that will work. For example a switch that only couples the socket to the capacitor when the plug 52 is connected and automatically connects to the motor when the plug is removed.

In the case of a helicopter the torque produced by the rotor blades is counteracted by the torque produced by the tail rotor. However, in the subject vehicle, the voltage produced by the capacitor and thus the torque produced by the propeller is continuously decreasing. It has been found that the longest observed hover occurs when the propeller torque required for hover equals the drag produced by the aircraft. Since the drag for producing the "counter torque" is essentially produced by the fins, drag is proportional to their size. Thus the fins are sized to produce a drag torque equal to the propeller torque at hover. Thus initially, when the voltage is at its maximum, the aircraft will rotate. When the voltage has dropped to near that required for hover, the aircraft's rotation slows to a minimum.

It is also important that the rotational inertia of the propeller is balanced by the inertia of the rest of the aircraft. When this is accomplished, the aircraft flies vertical upward and downward in a very stable manner. The inertia equations are as follows:

$$I_P = I_B$$

$$I_B = \Sigma M_B \times R_B$$

$$I_P = \Sigma M_P \times R_P$$

Where:

$I_P$=moment of inertia of propeller $I_B$=moment of inertia of components body of aircraft $\Sigma M_B$=mass of components of body of aircraft $\Sigma M_P$=mass of propeller $R_B$=distance of center of mass of components from axis of rotation of aircraft $R_P$=distance of center of mass of propeller from center of rotation of aircraft The torque is handled in a similar way:

$$T_P = T_B$$

$$T_B = \Sigma D_B \times N_B \times R_B$$

$$T_P = \Sigma D_P \times N_P \times R_P$$

Where:

$T_B$=body torque due to aerodynamic resistance $T_P$=propeller torque $\Sigma D_B$=Drag of body summation $\Sigma D_P$=Propeller drag summation $N_P$=Number of propeller blades $N_B$=Number of fins $R_B$=Center of drag distance from axis of rotation (half the span of the fins)

$R_P$=Center of thrust of propeller blade distance form axis of rotation

Thus it can be seen that the design for vertical takeoff and landing aircraft is simple to make and if the design considerations outlined herein are followed, the aircraft will rise and tend to hover and slowly descend as the capacitor's charge drops off. In addition, the aircraft will be quite stable during the flight.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the model aircraft industry.

What is claimed is:

1. A vertical takeoff and landing aircraft comprising:

a support structure;

a motor mounted vertically to said support structure, said motor having a propeller for rotation in a horizontal plane;

a power supply for said motor mounted to said support structure below said motor;

a plurality of fins having first and second ends, said first ends attached to said power supply, said plurality of fins extending radially outward from said power supply and equally spaced from each other;

vertical posts having first and second ends, said first ends of said vertical posts directly attached to said second ends of said plurality of fins and extending upward;

a ring mounted horizontally to said second ends of said plurality of vertical posts in proximity to the rotational plane of and surrounding said propeller.

2. The aircraft as set forth in claim 1 wherein the torque produced by the drag of said fins opposes the torque of said propeller.

3. The aircraft as set forth in claim 2 comprising the rotational inertia of said propeller equal to the rotational inertia of the remainder of the aircraft.

4. The aircraft as set forth in claim 3 wherein there are three fins.

5. The aircraft as set forth in claim 4 wherein said motor is and electric motor.

6. The aircraft as set forth in claim 5 where in said power supply is a capacitor.

7. The aircraft as set forth in claim 6 further comprising:

an electrical plug mounted on said support structure; and a switch mounted within said support structure, said switch for either electrical coupling said capacitor to said motor or coupling said capacitor to said plug;

such that said capacitor can be coupled to said plug for receiving a charging current or to said motor for powering same.

8. A vertical takeoff and landing aircraft having a support structure containing a motor mounted vertically to the support structure, the motor having a propeller for rotation in a horizontal plane about a vertical axis, and a power supply; wherein the torque produced by the drag of the support structure opposes the torque of the propeller, and the aircraft achieves hover when, the torque of the propeller is substantially equivalent to the torque of the support structure comprising:

a plurality of fins having first and second ends, said first ends attached to the power supply, said plurality of fins extending radially outward from the power supply and equally spaced from each other;

vertical posts having first and second ends, said first ends of said vertical posts directly attached to said second ends of said plurality of fins and extending upward.

9. The aircraft as set forth in claim 8 comprising the rotational inertia of the propeller about the vertical axis equal to the rotational inertia of the remainder of the aircraft about the vertical axis.

10. The aircraft as set forth in claim 9 comprising:

the power supply mounted vertically below the motor;

a plurality of fins having first and second ends, said first ends attached to the power supply; said plurality of fins extending radially outward from the power supply and equally spaced from each other;

vertical posts having first and second ends, said first ends of said vertical posts attached to said second ends of said plurality of fins and extending upward;

a ring mounted horizontally to said second ends of said plurality of vertical posts in proximity to the rotational plane of and surrounding said propeller.

11. The aircraft as set forth in 10 wherein there are three fins.

12. The aircraft as set forth in claim 11 wherein the motor is an electric motor.

13. The aircraft as set forth in claim 12 where in the power supply is a capacitor.

14. The aircraft as set forth in claim 13 further comprising:

an electrical plug mounted on said support structure; and a switch mounted within said support structure, said switch for either electrical coupling the capacitor to the motor or coupling the capacitor to said plug;

such that the capacitor can be coupled to said plug for receiving a charging current or to the motor for powering same.

* * * * *

UNITED STATES PATENT AND TRADEMARK OFFICE
CERTIFICATE OF CORRECTION

PATENT NO. : 6,550,715 B1
DATED : April 22, 2003
INVENTOR(S) : John Reynolds et al.

It is certified that error appears in the above-identified patent and that said Letters Patent is hereby corrected as shown below:

Column 2,
Line 24, replace "13" with -- 14 --.
Line 48, replace "the" with -- The --.

Column 5,
Delete lines 5-12.

Signed and Sealed this

Eleventh Day of November, 2003

JAMES E. ROGAN
*Director of the United States Patent and Trademark Office*